(No Model.) 2 Sheets—Sheet 1.
A. M. HEWLETT.
APPARATUS FOR MANUFACTURING PIPE.
No. 537,452. Patented Apr. 16, 1895.
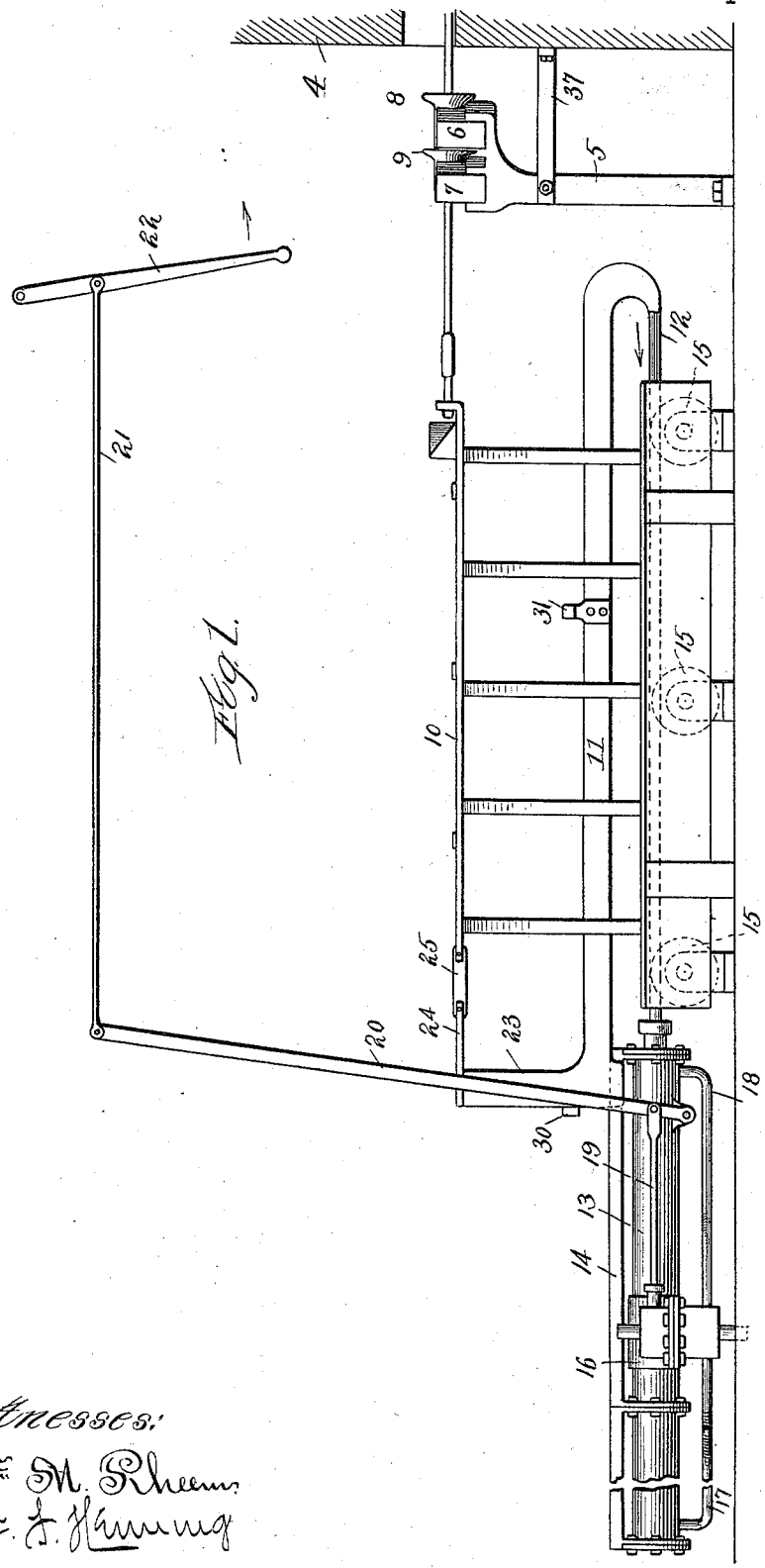

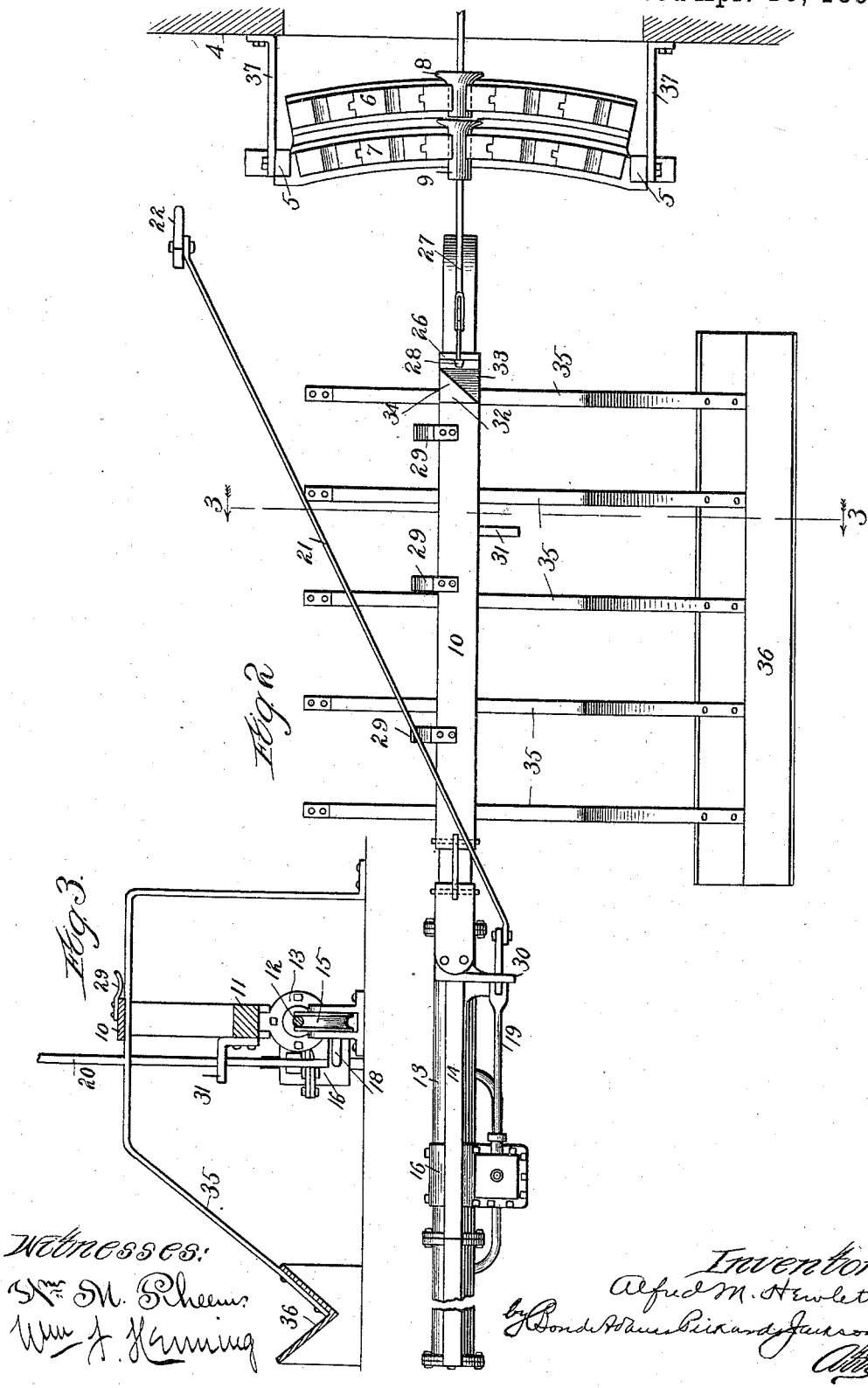

UNITED STATES PATENT OFFICE.

ALFRED M. HEWLETT, OF KEWANEE, ILLINOIS.

APPARATUS FOR MANUFACTURING PIPE.

SPECIFICATION forming part of Letters Patent No. 537,452, dated April 16, 1895.

Application filed April 24, 1894. Serial No. 508,887. (No model.)

*To all whom it may concern:*

Be it known that I, ALFRED M. HEWLETT, a citizen of the United States, residing at Kewanee, in the county of Henry and State of Illinois, have invented certain new and useful Improvements in Apparatus for Manufacturing Pipe, of which the following is a specification, reference being had to the accompanying drawings, in which—

Figure 1 is a side elevation. Fig. 2 is a plan view; and Fig. 3 is a vertical section on line 3—3 of Fig. 2.

My invention relates to the manufacture of what is known as butt-weld pipe, by drawing a strip of sheet metal, commonly called a skelp, at a welding heat through a die or bell which serves to deflect the edges of the skelp into circular form, bringing the two edges together, thereby welding them to form a pipe of the length of the skelp. The skelp is drawn through the bell by means of a tool commonly called a tag, which is secured to the forward end of the skelp by welding, or in some other suitable manner. In practice, a number of skelps, each having secured to its forward end a tag, are placed side by side in the furnace, where they are heated to a welding heat, the tag projecting several feet in front of the furnace. When a skelp arrives at the proper temperature the operator takes a welding die or bell and slips it upon the tag. He then connects the end of the tag to a buggy adapted to move in suitable ways upon a draw bench provided with an endless chain, by means of which the buggy is moved forward for the purpose of drawing the pipe. Supported upon the draw bench between the buggy and the furnace door is a bell holder, which is of such shape as to intercept and retain the bell as the tag is drawn forward by the movement of the buggy. The skelp is therefore drawn through the bell and formed into pipe. In some instances, instead of using a single bell, a second or reducing bell is also employed, both bells being slipped upon the tag before the skelp is drawn from the furnace. In such cases two bell holders placed one behind the other upon the draw bench, are used.

As above stated, it is usual to place several skelps in the furnace side by side, the object being to economize time, as while one skelp is being drawn others are heating. In order therefore to provide for bringing the skelp to be drawn and the bells into line, as is necessary to prevent the pipe from being bent or otherwise injured, it is necessary either to move the bell holder into line with the skelp or to shift the skelp in the furnace until it is brought into line with the bell holder. In practicing the latter method no particular mechanism is necessary, but in practicing the former method it has been customary to make the draw bench laterally movable, necessitating the use of more or less complicated mechanism for changing the position of the draw bench, as such bench must necessarily be heavy owing to the great strain to which it is subjected.

The method of procedure above outlined and the apparatus employed in practicing it are subject to many objections, one of the most important being the fact that it has heretofore been necessary to attach the tag to the skelp before it is placed in the heating furnace, entailing considerable loss to the manufacturer, since the time, labor and apparatus employed in welding the tag to the skelp not only materially increases the expense of manufacture, but also the heat to which it is subjected soon renders the tag unfit for further use, still further increasing the expense. In cases where the tags have been attached to the skelp by other means than welding, in addition to the fact that considerable time was consumed in attaching them to the skelp, the heat to which they were subjected frequently prevented the ready removal of the tags from the pipe after it was formed, thereby occasioning expensive delay. The use of a buggy for drawing the pipe is also very objectionable inasmuch as it requires the constant attention of a boy, and as the work is exceedingly trying it has been necessary to employ a number of additional boys so that they could relieve each other.

The object of my invention is to avoid the objections above pointed out, and to improve the machinery for manufacturing pipe, as will be hereinafter more fully set forth.

That which I regard as new will be set forth in the claims.

I will now describe my improved apparatus.

4 indicates the front wall of the heating furnace.

5 indicates a bell-holder support arranged in front of the furnace, as best shown in Figs. 1 and 2.

6—7 indicate two sets of bell-holders, the holders 6 being arranged between the holders 7 and the furnace, as shown in Fig. 1. The bell holders 6 are adapted to support the forming bell 8, while the bell holders 7 support the reducing bell 9. As best shown in Fig. 1, the bell-holders 6—7 are supported at such a height that the bells will be held in such position that their axes will be substantially upon a line with the lower edge of the furnace door, the upper surfaces of the bell-holders being slightly above such level. By this arrangement the bell-holders serve as supports for the skelp when the furnace is being charged. As shown in Fig. 2, the bell-holders are arranged in substantially the arc of a circle, the object of which will be hereinafter more fully set forth.

10 indicates a draw bar, which is connected by a bar 11 to a piston rod 12 which moves in a cylinder 13. The bar 11 slides upon a suitable guide 14 arranged in a suitable position, preferably over the cylinder 13, as shown in Figs. 1 and 2.

15 indicates rollers which support the piston rod 12.

16 indicates the steam chest of the cylinder 13, from which extend steam pipes 17—18 to opposite ends of the cylinder 13. Within the steam chest 16 is a suitable valve for directing steam into either of the pipes 17 or 18, which valve is operated by a valve rod 19 which is connected to a lever 20, the lever 20 being connected by a connecting rod 21 to a hand lever 22 located near the furnace in a convenient position for the operator. Inasmuch as the valve which controls the admission of steam into the cylinder 13 may be of any approved construction I have not considered it necessary to illustrate or describe it herein. The arrangement is such that as the piston rod 12 is reciprocated the draw bar 10 will be moved toward and from the furnace.

The draw bar 10 is connected to the bar 11 by a standard 23, a plate 24, and spring plate 25, the spring plate in the construction shown being interposed between the draw bar 10 and the plate 24, although if necessary it may be connected directly to the standard 23. The spring plate 25 serves to permit lateral movement of the draw bar 10 so that said bar may be moved into line with the different bell holders, which, as above stated, are arranged in the arc of a circle, the radius of which is substantially equal to the distance from the bell holders to the spring 25.

The draw bar 10 carries at its free end a fork 26 which is adapted to receive the end of a tag 27, said tag preferably having a knob 28 upon its end, as shown in Fig. 2. The tag 27 is of such construction that it may be attached to the skelp after it is heated and while it remains in the furnace, and also to permit the bell or bells to be slipped upon it after it is attached to the skelp. I have devised several forms of tags suitable for use in the manufacture of pipe by the method herein described, but as such tags form the subject matter of separate applications for patents, of even date herewith, I shall not describe their structure herein. It is sufficient for the purposes of the invention herein claimed to state that the tag may be attached to the skelp as above stated, and after the pipe is formed may at once be removed therefrom.

29 indicates supports, which are carried by the draw bar 10 and are adapted to support the tag 27 and carry it back to the furnace after it has been removed from the pipe, it being the business of the workman who removes the tag from the skelp after the pipe is drawn to place it upon the supports 29.

30—31 indicate arms carried by the bar 11, which arms are adapted to strike the lever 20 and move it sufficiently in one direction or the other to shut off the steam from the cylinder 13 and thereby stop the drawing mechanism, as will be hereinafter more fully set forth.

32 indicates a block which is mounted upon the draw bar 10 near the fork 26, which block is provided with inclined faces 33—34, as shown in Figs. 1 and 2. The block 32 serves to lift the end of the tag out of the fork 26 and to throw such tag laterally away from the draw bar 10 in cases where the return movement of the draw bar 10, (that is, movement toward the furnace,) commences before the tag has been removed from the fork, thereby preventing injury which might be done to the pipe.

35 indicates skids or guides, arranged under the draw bar 10 and leading to a trough 36. The pipe after it passes through the bell is received upon the skids 35, and is thence conducted to the trough 36, after which it is carried off for further treatment.

As best shown in Fig. 2, the bell holders 6—7 are provided with tongues and grooves so that they are fitted or dovetailed together, thereby making each series of bell holders practically a continuous piece, nevertheless permitting the removal of any particular bell holder if it should be necessary.

The operation is as follows: The operator standing at one side of the furnace applies a tag to one of the skelps. The welding and reducing bells are then slipped upon the tag and it is passed through the recess in the proper bell holders and slipped into the fork 26 of the draw bar, which is moved laterally until it comes into line with the tag. The lever 22 is then moved in the direction indicated by the arrow in Fig. 1, and steam is thereby directed through the pipe 18 into the cylinder 13, causing the piston 12 to move in the direction indicated by the arrow in Fig. 1, thereby moving the draw bar 10 in the same direction. The bells being intercepted by the bell holders the skelp is drawn through them and formed into pipe, after which it is received upon the skids 35. When the drawing stroke is completed the arm 31 strikes the lever 20 moving it back sufficiently to shut off steam from the pipe 18 and admit it through the pipe 17 to the other end of the cylinder 13, thereby causing the piston rod 12 and draw bar 10 to return into position for drawing another pipe. When the bar 11 has moved back to the proper point the arm 30 will strike the lever 20 and operate the valve rod 19 to stop the piston.

It will be noted that the bell holders are entirely separate from the draw bar, which construction is highly advantageous inasmuch as the drawing mechanism may therefore be made much lighter in construction as the strain which in other pipe drawing mechanisms is borne by the draw bench is in my improved construction entirely removed from the drawing devices, so that all that is necessary in the drawing mechanism is that it should be of sufficient tensile strength to draw the skelp through the bell. The bell supports, which are subjected to the greatest strain, are secured to the furnace by straps 27, as shown in Figs. 1 and 2.

It should be understood that the word skelp is herein used to apply to the strip of metal which is to be drawn through the bell regardless of whether or not such strip has been previously treated to make it adapt itself more readily to tubular form.

That which I claim as my invention, and desire to secure by Letters Patent, is—

1. The combination with a furnace adapted to receive a number of strips, of transversely movable drawing mechanism, and a plurality of stationary bell holders arranged in front of the furnace, substantially as described.

2. The combination with a furnace adapted to receive a number of strips, of transversely movable drawing mechanism, a plurality of stationary bell-holders arranged in front of the furnace, and a tool for seizing the skelp, said tool being adapted to be applied to the skelp after it is heated and to pass through the welding bell, substantially as described.

3. The combination with a transversely movable drawing mechanism, of a stationary bell-holder independent of the said drawing mechanism, substantially as described.

4. The combination with a transversely movable drawing mechanism, of a series of bell-holders supported independently of said drawing mechanism, substantially as described.

5. The combination with stationary bell-holders arranged in substantially the arc of a circle, of drawing mechanism adapted to move in a substantially circular path, substantially as described.

6. The combination with a furnace adapted to receive a number of skelps, of a series of stationary bell-holders arranged in front thereof, the tops of said holders being slightly above the lower edge of the furnace door, and transversely movable drawing mechanism moving independent of said bell-holders, substantially as described.

7. The combination with an independent bell holder, of a longitudinally and transversely movable drawing device adapted to be moved independently of the bell holder, and mechanism for longitudinally reciprocating said drawing device, substantially as described.

8. A pipe drawing device adapted to be reciprocated, said drawing device having a support for receiving and returning the tag, substantially as and for the purpose specified.

9. A pipe drawing device adapted to be reciprocated, and means whereby one end of a tag may be secured to said drawing device, in combination with means for automatically releasing the tag upon the return movement of said drawing device, substantially as described.

10. The combination with pipe-forming mechanism, of a draw bar, and a spring connecting said draw bar to said supporting devices, whereby lateral movement of said draw bar may be permitted, substantially as described.

11. The combination with a cylinder 13, piston rod 12, and bar 11, of a draw bar 10, and a spring 25 connecting said draw bar to said bar 11, substantially as described.

12. The combination with a draw bar, as 10, of supports 29, for receiving and returning the tag, substantially as described.

13. The combination with a draw bar, of a block 32, said block having inclines 33—34, substantially as and for the purpose specified.

14. The combination with supporting devices, of a series of bell holders interlocked one with the other and supported by said supporting devices, substantially as described.

15. The combination with supporting devices, of a series of bell holders supported thereby, said bell holders having tongues and grooves whereby the various bell holders will be locked together, substantially as described.

16. The combination with a cylinder 13, a piston rod 12, bar 11, and draw bar 10, of a valve rod 19, lever 20, and arms 30—31 carried by the bar 11, said arms being adapted to strike the lever 20, substantially as and for the purpose specified.

ALFRED M. HEWLETT.

Witnesses:
JOHN L. JACKSON,
ALBERT H. ADAMS.